UNITED STATES PATENT OFFICE.

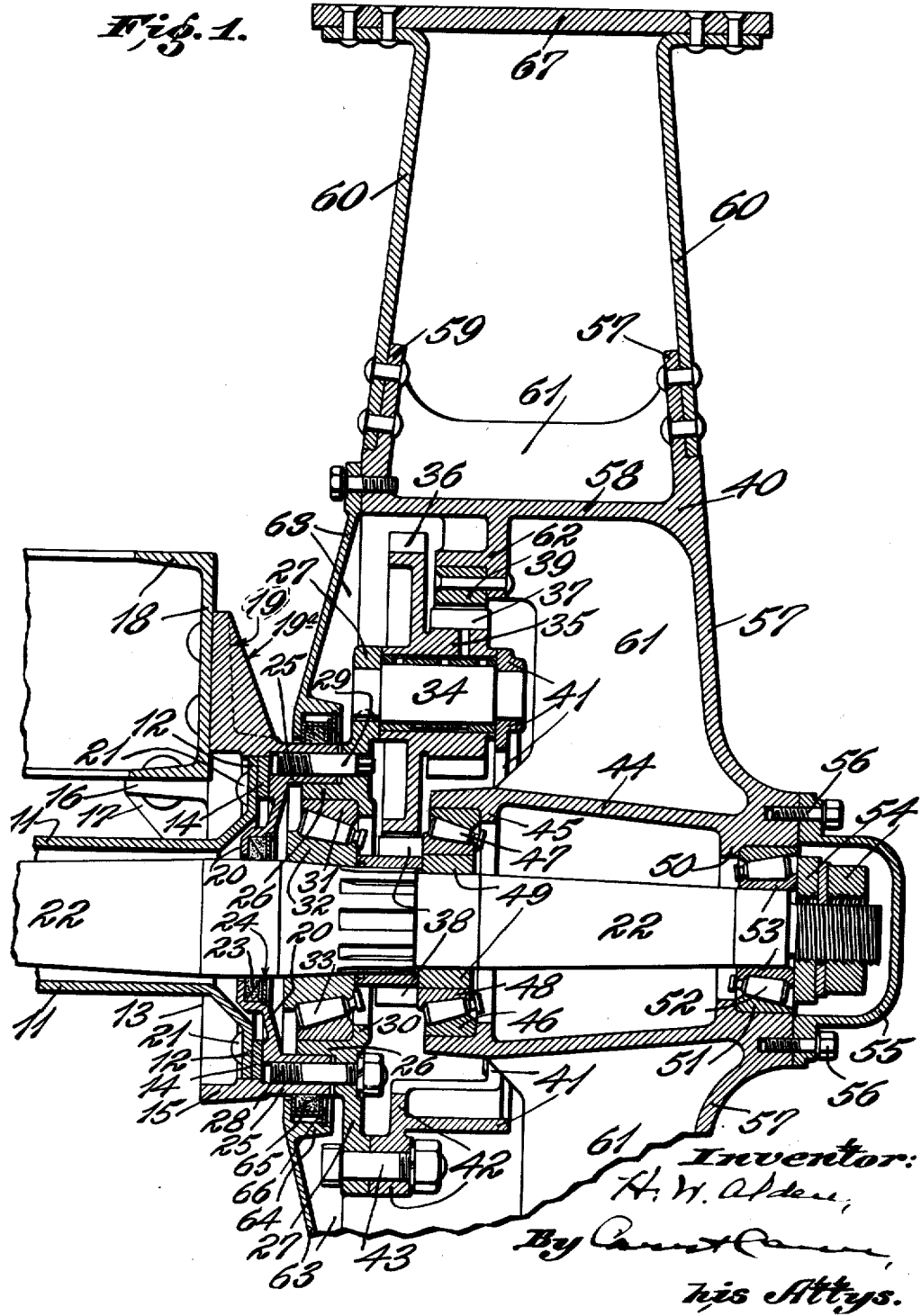

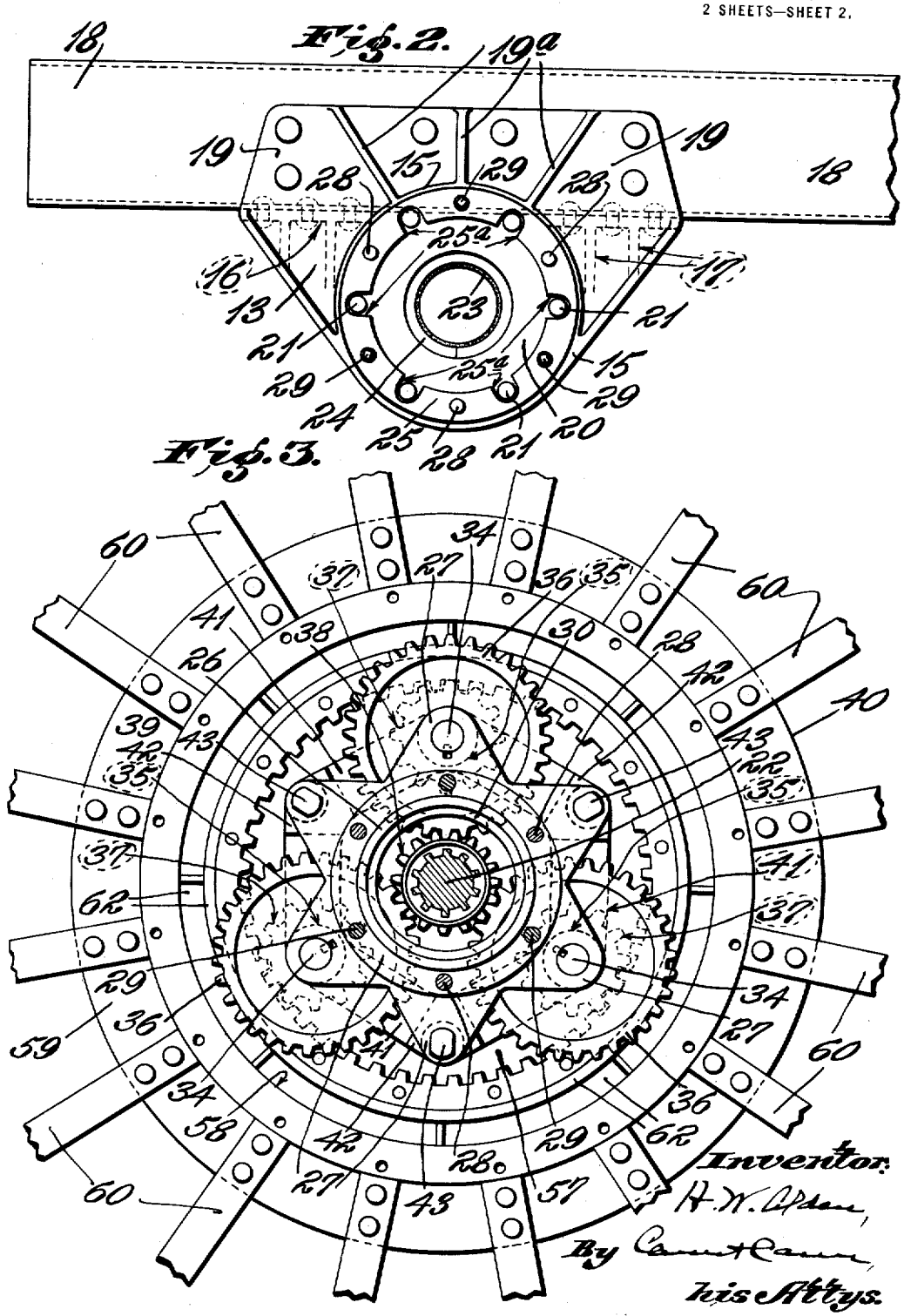

HERBERT W. ALDEN, OF DETROIT, MICHIGAN, ASSIGNOR TO THE TIMKEN-DETROIT AXLE COMPANY, OF DETROIT, MICHIGAN, A CORPORATION OF OHIO.

TRACTOR.

1,349,249.  Specification of Letters Patent.  Patented Aug. 10, 1920.

Application filed October 10, 1919. Serial No. 329,819.

*To all whom it may concern:*

Be it known that I, HERBERT W. ALDEN, a citizen of the United States, and a resident of the city of Detroit, in the county of Wayne and State of Michigan, have invented a new and useful Improvement in Tractors, of which the following is a specification.

My invention relates to self-propelled vehicles, especially tractors and trucks and has for its principal objects to provide ample gear reduction without decreasing the road clearance, to provide for the proper housing of the reducing gears, to provide proper support for the traction wheel driving gears and for their proper intermeshing with the gear rings on the traction wheels, and to obtain other advantages hereinafter appearing.

The invention consists in the combinations and arrangements of parts hereinafter described and claimed.

In the accompanying drawing wherein like reference numerals indicate like parts wherever they occur, Figure 1 is a vertical central section through a tractor wheel and support conforming to my invention;

Fig. 2 is a side view with the tractor wheel and axle shaft removed and showing the end portion of the axle housing and the bracket riveted thereto; and Fig. 3 is a vertical view illustrating the reducing gearing inside of the wheel.

My tractor comprises a propeller shaft, a differential mechanism operatively connected thereto, shaft sections operatively connected to receive motion from the differential mechanism and transmit motion to the traction wheels, and an axle housing for incasing the propeller, differential mechanism and shaft sections. This construction of driving axle is well known and it is considered unnecessary to illustrate it in detail. The tubular ends of the arms of the axle housing 11 are flanged outwardly, as at 12, and have riveted on their outer faces bracket members 13 that serve divers purposes, a washer or spacing member 14 being preferably located between the axle flanges 12 and said brackets 13. Each bracket member 13 extends radially beyond the flange 12 of the housing 11 and has a hub-shaped portion 15 formed on its lower portion together with a horizontal rib 16 that extends farther inwardly and is braced or reinforced by strengthening ribs or brackets 17. This horizontal member 16 constitutes a shelf or seat for the side member 18 of the body frame, which are preferably of channel shape and have one flange resting on said seat with their web portions turned outwardly. Integral with said bracket member and extending upwardly from the hub portion 15 thereof is a portion 19 which is strengthened by reinforcing ribs 19ª and whose inner face is substantially vertical and in position for the side member 18 of the body frame to rest against, when the flange thereof is placed upon its seat. The web of the channel 18 is riveted horizontally to the flat vertical portion 19 of the bracket and the bottom flange of the channel 18 is riveted to its seat. It is noted that this construction is not only simple and strong but that it places the body frame above the end portions of the axle.

The outwardly flanged end portion 12 of the axle housing together with the spacing member 14 is preferably secured to a diaphragm or spider 20 formed in the hub portion 15 of the bracket member 13 by means of rivets 21; and at its middle the diaphragm has a hole large enough to permit the shaft section 22 to extend therethrough. Surrounding this hole is an annular recess adapted to receive a packing ring 23 and a split ring 24 or other means for locking the packing in place.

The hub-shaped portion 15 of the bracket 13 projects beyond the outer face of said bracket member in the form of a heavy annular rib 25, which is concentric with the axle. The inner face of the heavy annular rib 25 of the bracket member 13 is notched as at 25ª to form seats for the rivets 21 which secure the flanged portion 12 of the axle housing 11, together with the spacing washer 13, to the diaphragm 20 formed in the hub portion 15 of the bracket member 13. Inside of said annular rib 25 and fitting the inner face thereof is an annular rib 26 which projects from the inner side face of a six pointed star-shaped spider or anchor bracket 27 that is adjustable axially with respect to the annular member of the bracket member. For this purpose, the annular rib 25 of the bracket member 13 is provided with a number of threaded holes parallel with its axis and the spider 27 is provided with holes adapted to register therewith; and the parts are secured together by means of stud bolts 28, with spacing washers or shims intervening to properly position the spider relative to the bracket.

Rotation of the anchor member 27 with respect to the bracket member is further prevented by means of dowel-studs 29, which also serve to properly position the anchor member. At the outer end of the hub of the spider or anchor member 27, a flange or shoulder 30 is formed to constitute the abutment for the hub or outer bearing member 31 of a conical roller bearing. The corresponding cone or inner bearing member 32 is mounted on the shaft section 22, which is tapered slightly for the purpose. Conical rollers 33 are used; and the adjustment thereof is effected by the adjustment of the spider 27 relative to the annular rib 25 of the bracket member 13.

The spider has one or more, preferably three, arbors or spindles 34 rigidly mounted thereon and parallel with the axle shaft. The method illustrated in the drawing of securing the arbors or spindles to the spider is by reducing the inner ends of the arbors to fit holes provided for them in every other one of the six projecting points or lugs of the star-shaped spider, and to form shoulders that will bear against the face of the spider, a key or locking pinion extending tangentially through the spider and a segmental groove provided for the purpose in the end of the arbor.

Rotatably mounted on each of the arbors 34 with an antifriction lining intervening is the hub of a double gear wheel 35, that is, a gear wheel that has two gears 36 and 37 of different diameters integral therewith. The inner of these two wheels is the larger one 36 and is of proper size to mesh with the pinion 38 provided therefor on the driving shaft 22, which has longitudinal slots or keyways formed thereon to coöperate with corresponding portions on said pinion. The second or outer gear 37 on said hub is a smaller pinion in position to intermesh with a large gear ring 39 mounted in the traction wheel 40 concentric with the axle shaft. By this arrangement, the power transmitted through the propeller, differential and axle section 11 is transmitted through the axle shaft pinion 38 to the spider gears 36 and 37 and thence to the ring gear 39 mounted in the traction wheels 40 to drive the same.

The outer ends of the arbors 34, on which the double idler gears 35 are journaled, are supported by means of a hexagonal arbor supporting frame 41. The outer ends of the three arbors are reduced to fit holes provided for them in every other one of the six angles or points formed by the six sides of the hexagonal arbor supporting frame 41, and at the other three angles or points of the arbor supporting frame, between the three arbors, the frame is offset inwardly as at 42 toward the star-shaped anchor member 27. These offset portions 42 of the arbor supporting frame 41 are provided with holes which register with holes in the three adjacent points of the star-shaped anchor member 27, and the anchor member and the supporting frame are secured together by bolts 43 which extend through these registering openings.

The hub of the driving wheel 40 comprises a hollow hub portion 44 adapted to receive roller bearings at its inner and outer ends. Near its inner end the hub has an inwardly extending rib 45 that serves as an abutment for the cup or outer cage 46 of a conical roller bearing 47, whose corresponding cone or inner bearing member 48 is mounted on a ring 49 removably mounted on the shaft section. Near the outer end of the hub of the wheel is an inwardly extending rib or shoulder 50 that serves as an abutment for the outer member 51 of a conical roller bearing 52 whose corresponding cone or inner bearing member 53 is mounted directly on the axle shaft 22. The end of the shaft section is threaded and provided with suitable adjusting and locking nuts 54 in accordance with common practice; and likewise, the ends of the axle shafts are protected by a cap 55 secured to the hub by cap screws 56. By this arrangement, not only is the shaft section supported on antifriction bearings, but the hub of the wheel also is connected to the axle shaft by two sets of antifriction bearings that are widely separated.

Near its outer end, the hub of the wheel is provided with a disk-like radial extension 57; and near the outer periphery thereof is an annular shell 58 which in turn, is provided on its inner end with an outwardly projecting annular portion 57 for the attachment of the spokes 60. The whole hub structure is provided with reinforcing ribs in the form of radial partitions 61 on both sides of the outer shell member. Said outer shell member extends in the direction of the differential mechanism far enough to overlap the spider gears 36 and 37; and the inner portion of said shell is provided with an annular rib or projection 62 of angular section adapted to form an angular seat for the gear ring 39 that is riveted thereto in proper position to intermesh with the spider pinion 37. A disk 63 with a central perforation is bolted to the annular flap 59 on the inner face of the hub member of the wheel and serves to complete the casing or housing for the gearing. For this purpose, the central portion of said disk is perforated to pass over the annular rib 25 of the bracket member 13 and has an annular flange 64 near its inner edge adapted to form a seat or recess for packing 65, an annular groove being formed in said flange to receive a split ring 66 or other device for holding the packing in position.

It is noted that the outer portions 57 and 59 of the hub member 41, that is the portions to which the spokes 60 are attached, converge slightly. The spokes 60 are preferably flat plates riveted flatwise to the marginal portions 57 and 59 of said hub member and the outer ends are bent substantially parallel with the axle and are riveted or otherwise rigidly secured to a heavy rim or tread member 67 on the outside of which grousers may be secured, if desired.

By reason of the construction just described, an oil-tight chamber is formed that entirely incases all of the gear ring between the shaft section and the traction wheel, which casing not merely insures the proper lubrication of these parts but protects them from grit and dirt. At the same time, the arrangement locates the hub bearings substantially in the plane of the wheel and locates the connection between the intermediate pinions and the gear ring also in the plane of the inner bearing of the hub as well as in the plane of the wheel.

A very important advantage of this construction is that on account of the large reduction in speed between the driving shaft section and the traction wheel, excessive torsion on the shaft sections and excessive pressure on the teeth are avoided, and for the same reason, the main gear of a differential mechanism may be made considerably smaller than is permissible in transmission mechanism of the common type. This decrease in the size of the main gear of the differential mechanism makes it possible, in turn, to correspondingly decrease the depth of the inclosing housing and thereby increase the clearance of the housing above the ground.

It is noted as an important advantage of my invention that the traction wheel may be quickly and easily mounted on and dismounted from the tractor after the closing disk is removed; for the pinions with which its gear ring meshes cannot move independently and therefore, when one of those pinions is in position to receive the gear ring, the other pinions are likewise in position. Besides, as all of the driving mechanism is supported on the housing, it is easier to handle the wheel and there is greater certainty of proper fitting and working.

It is noted also that the construction provides a simple means for adequately adjusting the bearings. The adjustment of the wide spreading bearings of the hub of the wheel is by means of the adjusting nut that works on the threaded end of the axle section and bears against the cone or inner bearing member of the outer hub bearing, thus tending to move endwise of the shaft any and all parts between the adjusting nut and the abutment.

It is also noted that by the arrangement described, the gearing is incased in a substantially oil-tight housing and is amply protected from dirt and dust.

While I have described the invention as an improvement in tractors, it is obvious that the invention is equally applicable to trucks and other self-propelled vehicles; and I wish the word "tractors" to be taken broad enough to cover other types of self-propelled vehicles. Obviously the construction hereinbefore described admits of considerable variation without departing from my invention.

What I claim is:

1. In a tractor or the like, a hollow axle housing, spiders rigidly secured to the ends thereof, gears rotatably mounted on said spiders, axle shafts in said housing and projecting endwise therefrom, traction wheels rotatably mounted on said shaft sections and operatively connected to the spider gears, and pinions on the shaft sections coöperating with said spider gears.

2. In a tractor or like vehicle, a hollow axle housing, double gears supported from the ends thereof, an axle shaft in said housing and projecting endwise therefrom, a traction wheel mounted on said shaft section and operatively connected to said double gears to be driven thereby, and a pinion on the shaft section coöperating with said double gears.

3. In a tractor or like vehicle, a hollow axle housing, double gears supported from the ends thereof, an axle shaft in said housing and projecting endwise therefrom, a traction wheel mounted on said shaft section and operatively connected to said double gears to be driven thereby, and a pinion on the shaft section coöperating with said double gears, said double gears comprising a larger member next to the axle housing and meshing with said shaft pinion and a smaller gear outwardly from the larger gear and meshing with the traction wheel gear.

4. In a self-propelled vehicle, a hollow axle housing, a gear support rigidly secured to the end thereof, double gears rotatably mounted on said support, an axle shaft in said housing and projecting endwise therefrom, a traction wheel on said shaft section and provided with a gear, and a pinion on the shaft section, said double gears comprising a larger gear meshing with said shaft pinion and a smaller gear meshing with the traction wheel gear.

5. In a tractor, a hollow axle housing, shaft sections in said housing and projecting from the ends thereof, a pinion on the projecting end of each shaft section, a traction wheel rotatably mounted on the projecting end of each shaft section and having an internal gear mounted thereon, gears rotatably mounted on the housing parallel with the axle shaft and comprising a pinion member intermeshing with said gear ring and a larger gear intermeshing with the pinion on the shaft section.

6. In a tractor, a hollow axle housing, a shaft section in said housing and projecting from the ends thereof, a spur pinion on said shaft section, a traction wheel rotatably mounted on the projecting end of said shaft section and having an internal gear ring mounted thereon, double spur gears rotatably supported from the housing parallel with the axle shaft and comprising a pinion member intermeshing with said gear ring and a larger gear intermeshing with the pinion on the axle section.

7. In a tractor, a hollow axle housing, a driving shaft section located therein and projecting from the end thereof, a pinion on said shaft section, a traction wheel rotatably mounted on the end of said axle section and having a gear ring on the inner side thereof, and gears supported from said axle housing parallel and concentric with said shaft section and adapted to transmit motion from the shaft section gear to the traction wheel gear.

8. In a tractor, a hollow axle housing, a driving shaft section located therein and projecting from the end thereof, a pinion on said shaft section, a traction wheel rotatably mounted on the end of said axle section and having a gear ring on the inner side thereof, gears supported from said axle housing parallel and concentric with said shaft section and adapted to transmit motion from the shaft section gear to the traction wheel gear, the hub portion of said traction wheel comprising a hollow shell having internal shoulders near its opposite ends and roller bearings abutting against said soulders and intervening between said hub and shaft section.

9. In a tractor, a hollow axle housing, a driving shaft section located therein and projecting from the end thereof, a pinion on said shaft section, a traction wheel rotatably mounted on the end of said axle section and having a gear ring on the inner side thereof, gears supported from said axle housing parallel and concentric with said shaft section and adapted to transmit motion from the shaft section gear to the traction wheel gear, the hub portion of said traction wheel comprising a hollow shell having internal shoulders near its opposite ends and roller bearings abutting against said shoulders and intervening between said hub and shaft section, and an outer elongated shell inclosing said first mentioned shell and having an inwardly extending flange for supporting said gear ring, and a closure plate mounted on the inner end of said outer shell.

10. In a tractor, a hollow axle housing, a driving shaft section located therein and projecting from the end thereof, a pinion on said shaft section, a traction wheel rotatably mounted on the end of said axle section and having a gear, gears supported from said axle housing and adapted to transmit motion from the shaft section gear to the traction wheel gear, a housing for the gearing, said housing comprising a hub portion of said traction wheel and a closure plate mounted on the inner end of said hub portion with provision for the shaft section to extend therethrough, said hub portion comprising an inner shell for mounting it rotatably on the shaft section, an outer shell incasing the gearing and an outer end wall.

11. In a tractor, an axle housing, a driving shaft section therein and projecting endwise therefrom, a traction wheel rotatably mounted on said projecting end of the axle section and a reduction gearing operatively connecting said traction wheel to said shaft section to be operated thereby and a housing for housing said reduction gearing, the middle portion of said wheel constituting the side and outer end of the housing, and the inner end of the housing consisting of a member rigidly secured to the inner end of the other housing member and having a central opening for the shaft section.

12. In a tractor, an axle housing, a driving shaft section therein and projecting endwise therefrom, a traction wheel rotatably mounted on said projecting end of the axle section, a reduction gearing supported from the axle housing and operatively connecting said traction wheel to said shaft section to be operated thereby, and a housing for housing said reduction gearing, the middle portion of said wheel constituting the side and outer end of the housing, and the inner end of the housing consisting of a member rigidly secured to the inner end of the other housing member and having a central opening for the shaft section.

13. In an automobile of the kind described, a hollow axle housing adapted to support the body, traction wheels, and driving axle sections in said housing and operatively connected to said wheels, said hollow axle housing having a bracket member rigidly secured to the ends thereof and constituting an angular seat above the axle housing and channel-shaped body frame members seated on and rigidly secured to said bracket seats.

14. A hollow axle housing having a bracket member rigidly secured to the ends thereof, said bracket member supporting a bearing for the driving shaft and gearing for transmitting motion from the shaft section to the traction wheel.

15. In an automobile of the kind described, a hollow axle housing adapted to support the body, traction wheels, and driving shaft sections in said housing and operatively connected to said wheels, said housing having a bracket member rigidly secured to each end thereof and constituting an angular seat above the axle housing and channel shaped body frame members seated on and rigidly secured to said bracket seats, and each bracket member also supporting the bearing for the driving shaft and gearing for transmitting motion from the shaft section to the traction wheel.

Signed at Detroit, Michigan, this 6th day of October, 1919.

HERBERT W. ALDEN.